US010922032B2

(12) United States Patent
Prabhu et al.

(10) Patent No.: US 10,922,032 B2
(45) Date of Patent: Feb. 16, 2021

(54) PRINTING FROM AN UNTRUSTWORTHY SOURCE

(71) Applicant: Hewlett-Packard Development Company, L.P., Houston, TX (US)

(72) Inventors: Sandeep Matti Prabhu, Bangalore (IN); Rajesh Bhatia, Bangalore (IN); Vaibhav Misra, Gurgaon (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 685 days.

(21) Appl. No.: 14/718,602

(22) Filed: May 21, 2015

(65) Prior Publication Data
US 2015/0254033 A1 Sep. 10, 2015

Related U.S. Application Data

(63) Continuation of application No. 13/754,945, filed on Jan. 31, 2013, now abandoned.

(51) Int. Cl.
*G06F 3/12* (2006.01)
(52) U.S. Cl.
CPC .......... *G06F 3/1222* (2013.01); *G06F 3/1219* (2013.01); *G06F 3/1231* (2013.01); *G06F 3/1239* (2013.01); *G06F 3/1254* (2013.01); *G06F 3/1289* (2013.01)
(58) Field of Classification Search
None
See application file for complete search history.

(56) References Cited

U.S. PATENT DOCUMENTS

| 5,611,050 | A | 3/1997 | Theimer et al. |
| 6,958,824 | B2 | 10/2005 | Whitmarsh |
| 6,975,419 | B2 | 12/2005 | Staas et al. |
| 7,075,409 | B2 | 7/2006 | Guba |
| 7,298,511 | B2 | 11/2007 | Lay et al. |
| 7,321,437 | B2 | 1/2008 | Parry |
| 7,375,838 | B2 | 5/2008 | Moneypenny et al. |
| 7,474,423 | B2 | 1/2009 | Garcia et al. |
| 7,729,001 | B2 | 6/2010 | Perronnin |

(Continued)

FOREIGN PATENT DOCUMENTS

KR 1020050063208 A 6/2005
WO WO-20000076204 A1 12/2000

OTHER PUBLICATIONS

Accunet, Inc., "Alias Account Information," SiteBuilder User's Guide, (Web Page), available Dec. 20, 2010, <http://www.sbusers.com/1/sbusers/using_aliases.asp>.

(Continued)

*Primary Examiner* — Nicholas Pachol
(74) *Attorney, Agent, or Firm* — HP Inc. Patent Department

(57) ABSTRACT

Disclosed herein are a system, non-transitory computer-readable medium, and method for printing. A plurality of unique identifiers can be generated for a printing device, each of the plurality of email addresses being associated with a unique printing configuration to handle print requests. A print request can be received from a print request source, where the print request is addressed to a specified unique identifier. The received print request can be handled in accordance with the unique printing configuration associated with the specified unique identifier.

14 Claims, 4 Drawing Sheets

(56) References Cited

U.S. PATENT DOCUMENTS

| | | | |
|---|---|---|---|
| 7,814,116 | B2 | 10/2010 | Hauser |
| 9,146,953 | B1* | 9/2015 | Hernacki .............. G06F 21/556 |
| 2003/0067625 | A1 | 4/2003 | Kim |
| 2004/0167974 | A1 | 8/2004 | Bunn et al. |
| 2005/0198572 | A1 | 9/2005 | Quiller et al. |
| 2007/0229886 | A1 | 10/2007 | Sakurai |
| 2007/0271347 | A1 | 11/2007 | Logue et al. |
| 2008/0007759 | A1 | 1/2008 | Furuyama et al. |
| 2008/0307059 | A1* | 12/2008 | Ono ....................... G03G 21/02 709/206 |
| 2009/0327502 | A1 | 12/2009 | Brewer et al. |
| 2010/0014110 | A1 | 1/2010 | Munetomo |
| 2010/0141993 | A1* | 6/2010 | Dowling .............. G06F 21/606 358/1.15 |
| 2011/0085196 | A1 | 4/2011 | Liu et al. |
| 2011/0090529 | A1 | 4/2011 | Hertling |
| 2011/0157630 | A1* | 6/2011 | Otaka ................... G06F 3/1208 358/1.15 |
| 2011/0292439 | A1 | 12/2011 | Nagata et al. |
| 2012/0084365 | A1 | 4/2012 | McCann, Jr. |
| 2012/0147199 | A1* | 6/2012 | Lorsch .............. H04N 1/00137 348/207.2 |
| 2012/0194850 | A1* | 8/2012 | K. ......................... G06F 3/1204 358/1.15 |
| 2012/0250076 | A1 | 10/2012 | Kumar et al. |
| 2012/0297026 | A1 | 11/2012 | Polis et al. |
| 2012/0300251 | A1* | 11/2012 | St. Laurent ........ H04N 1/00244 358/1.15 |
| 2012/0307268 | A1 | 12/2012 | Miller et al. |
| 2013/0021643 | A1* | 1/2013 | Nuggehalli ........ H04N 1/00331 358/1.15 |
| 2013/0063774 | A1 | 3/2013 | Nuggehalli et al. |
| 2013/0185364 | A1 | 7/2013 | Bhatia |
| 2013/0308165 | A1 | 11/2013 | Venkatesh et al. |
| 2014/0022585 | A1 | 1/2014 | Cogan |

OTHER PUBLICATIONS

Accunet, Inc., "Alias Account Information," SiteBuilder User's Guide, (Web Page), available Feb 8, 2013, <http://web.archive.org/web/20130208122841/http://www.sbusers.com/1/sbusers/using_aliases.asp>.

Citrix, "Controlling Printing Settings and User Preferences," XenApp Product Documentation, available as of Jan. 6, 2014, <http://citrix.edocspdf.com/media/output/en.xenapp6-w2k8-admin.ps-controlling-print-settings-v2.pdf>.

E. Gardner, New Business Models, Interview 2.0, "Peecho uses the cloud to turn your digital publication into print," Lean Back 2.0, May 17, 2012, pp. 1-5, The Economist Newspaper Limited 2013, Available at: <economistgroup.com/leanback/new-business-models/peecho-uses-the-cloud-to-turn-your-digital-pub.

Everyoneprint, "Installation and Configuration Guide," (Research Paper), Feb. 24, 2014, 140 pages, available at http://www.everyoneprint.com/files/EveryonePrintInstallGuide-EN.pdf.

Google Cloud Print, 2013, pp. 1-10, Available at: <support.google.com/cloudprint/?hl=en>.

Improbulus, "How to use Gmail aliases to organise emails and handle spam," Apr. 6, 2005, A Consuming Experience, (Web Page), <http://www.consumingexperience.com/2005/04/how-to-use-gmail-aliases-to-organise.html>.

Microsoft, "Filtering mails to email aliases with inbox rules?" (Web Page), Microsoft Office 365 Community, posts dated Dec. 9, 2011-Jun. 20, 2013, 5 pages, available at http://community.office365.com/en-us/forums/158/t/11534.aspx.

Mozilla Foundation, "Configuring Email Aliases," Mozilla Support, Thunderbird, (Web Page), available Jun. 21, 2012, <https://support.mozilla.org/en-US/kb/configuring-email-aliases>.

Mozilla Thunderbird, "Configuring Email Aliases," (Web Page), Jan. 31, 2013, 1 page, available at http://web.archive.org/web/20130131063620/https://support.mozillamessaging.com/en-US/kb/configuring-email-aliases.

openuse.org, "SDB:Using Your Own Filters to Print with CUPS," accessible online Nov. 2, 2013, <http://en.opensuse.org/SDB:Using_Your_Own_Filters_to_Print_with_CUPS>.

Patterson, P., "Digging Deeper into OAuth 2.0 on Force.com," developerforce, 2012, pp. 1-20, Salesforce.com, available at: http://wiki.developerforce.com/page/Digging_Deeper_into_OAuth_2.0_on_Force.com.

Printeron, "PrinterOn Mobile Printing for Airports," 2012, pp. 1-4, available at: http://printeron.com/industry/airports.html.

Printeron, "Downloads, PDS—Print Delivery Station," Oct. 21, 2012, 2 pages, available at http://web.archive.org/web/20121021095721/http://www.printeron.com/support/downloads.html.

Spiceworks, "Exchange rule to filter emails sent to specific alias," (Web Page), posts dated Jun. 3, 2010-Jun. 28, 2010, 3 pages, available at http://community.spiceworks.com/topic/100741-exchange-rule-to-filter-emails-sent-to-specific-alias.

Wikipedia, "Controlled payment number," Aug. 29, 2012, <http://web.archive.org/web/20120829155930/http://en.wikipedia.org/wiki/Controlled_payment_number>.

* cited by examiner

300

IDENTIFIER 1

| | |
|---|---|
| Number of pages per request | 2 |
| Maximum Number of Pages Total | 200 |
| Data types | *.html,*.csv |
| Ink per request | ..☐..................... 2% |
| Total ink | ..........☐.......... 48% |
| Keywords | soccer, vegan recipes |

*Fig. 3*

PRINTING FROM AN UNTRUSTWORTHY SOURCE

CROSS REFERENCE TO RELATED APPLICATION

This application is a Continuation of U.S. patent application Ser. No. 13/754,945, filed Jan. 31, 2013, entitled "PRINTING FROM UNTRUSTWORTHY SOURCE"—hereby incorporated by reference in its entirety.

BACKGROUND

Network printers heretofore may be associated with an identifier, such as a unique email address, that may act as a recipient for print content. This print content may then be routed to the printer. Access to printing via the identifier may be restricted using a white listing approach. In this instance, only certain pre-approved users can print via the identifier.

BRIEF DESCRIPTION OF THE DRAWINGS

FIG. 3 is an example screen shot in accordance with aspects of the present disclosure.

DETAILED DESCRIPTION

As noted above, a network printing device may be associated with an identifier that allows trustworthy sources to transmit print requests thereto. Web enabled network printers have increased the demand for mechanisms that restrict access to such printers. However, users may still be interested in printing content contained in sources considered to be untrustworthy. For example, some public content generated from RSS/ATOM feeds, social networking groups, or forums may be of interest. Nevertheless, a subscriber may be weary of providing these public sources unfettered access to their printing device. If left unchecked, there may be instances of misuse or exploitation. For example, an unscrupulous member of these public sources may send a high volume of content to overload the printing device. Moreover, countless online marketers may send advertisements to the printer as part of their marketing strategy.

A method is disclosed comprising associating, using at least one processor, an identifier with a printing device; associating, using the at least one processor, the identifier with a configuration comprising instructions for the printing device when handling a print request associated with the configuration; determining, using the at least one processor, whether a received print request originates from a trustworthy source; and if the print request originates from an untrustworthy source, associating, using the at least one processor, the received print request with the configuration such that the printing device handles the received print request in accordance with the configuration.

In view of the foregoing, disclosed herein are a system, non-transitory computer readable medium, and method to manage printing requests from untrustworthy sources. In one example, a configuration may be associated with a printing device. In another example, if a print request is received from an untrustworthy source, the print request may also be associated with the configuration such that the request is handled in accordance therewith. Thus, the owner of a printing device may use the configuration to limit access to a printing device. This allows a user to print content from untrustworthy sources that may be of interest without worrying about the potential for misuse or exploitation. The aspects, features and advantages of the present disclosure will be appreciated when considered with reference to the following description of examples and accompanying figures. The following description does not limit the application; rather, the scope of the disclosure is defined by the appended claims and equivalents.

Figure 1:
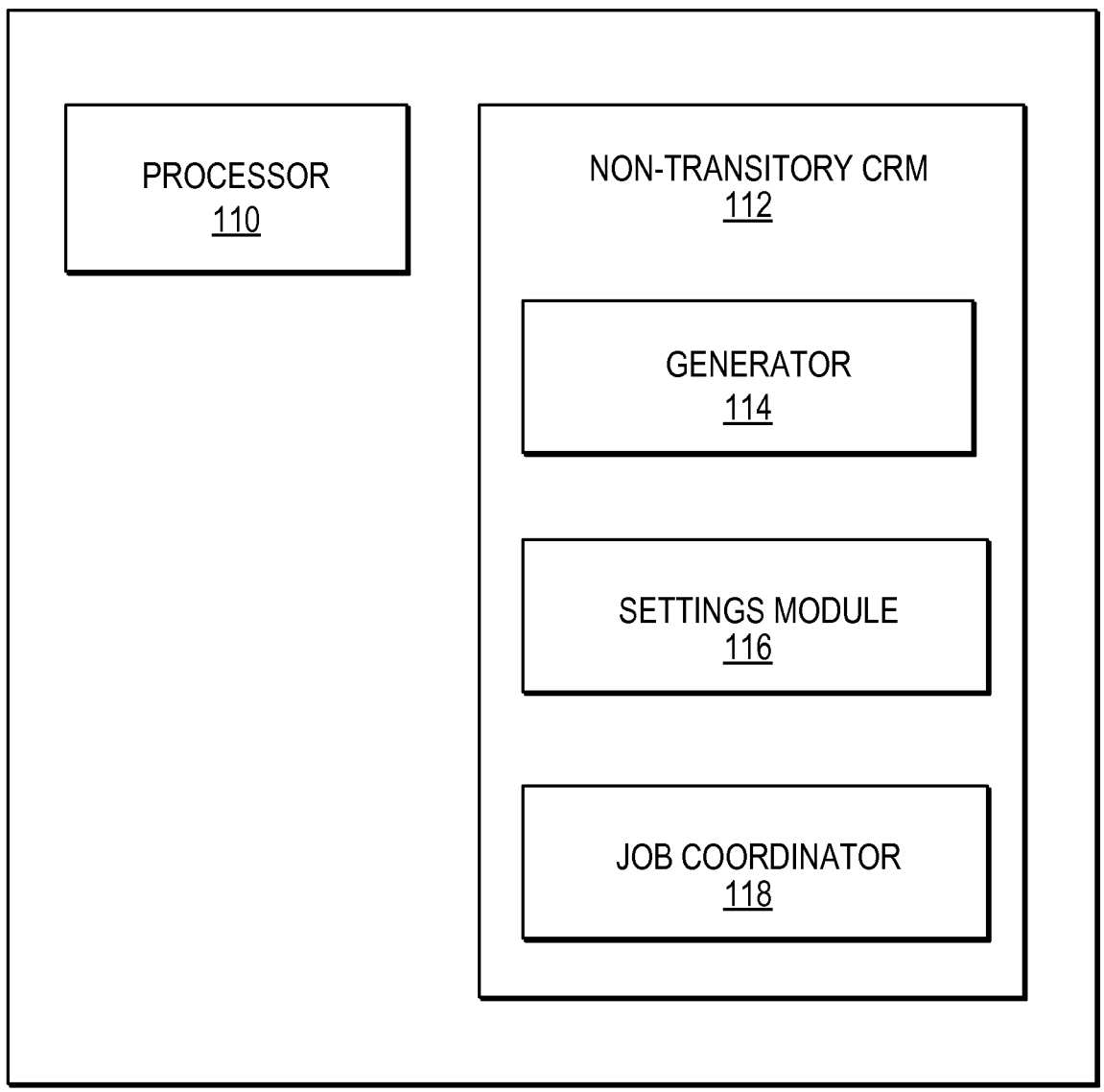
FIG. 1 is a block diagram of an example system in accordance with aspects of the present disclosure.

FIG. 1 presents a schematic diagram of an illustrative computer apparatus 100 for executing the techniques disclosed herein. The computer apparatus 100 may include all the components normally used in connection with a computer. For example, it may have a keyboard and mouse and/or various other types of input devices such as pen-inputs, joysticks, buttons, touch screens, etc., as well as a display, which could include, for instance, a CRT, LCD, plasma screen monitor, TV, projector, etc. Computer apparatus 100 may also comprise a network interface (not shown) to communicate with other devices over a network. The computer apparatus 100 may also contain a processor 110, which may be any number of well known processors, such as processors from Intel® Corporation. In another example, processor 110 may be an application specific integrated circuit ("ASIC"). Non-transitory computer readable medium ("CRM") 112 may store instructions that may be retrieved and executed by processor 110. As will be discussed in more detail below, the instructions may include a generator 114, a settings module 116, and a job coordinator 118. In one example, non-transitory CRM 112 may be used by or in connection with any instruction execution system that can fetch or obtain the logic from non-transitory CRM 112 and execute the instructions contained therein.

Non-transitory computer readable media may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, a portable compact disc or other storage devices that may be coupled to computer apparatus 100 directly or indirectly. Alternatively, non-transitory CRM 112 may be a random access memory ("RAM") device or may be divided into multiple memory segments organized as dual in-line memory modules ("DIMMs"). The non-transitory CRM 112 may also include any combination of one or more of the foregoing and/or other devices as well. While only one processor and one non-transitory CRM are shown in FIG. 1, computer apparatus 100 may actually comprise additional processors and memories that may or may not be stored within the same physical housing or location.

The instructions residing in non-transitory CRM 112 may comprise any set of instructions to be executed directly (such as machine code) or indirectly (such as scripts) by processor 110. In this regard, the terms "instructions," "scripts," and "applications" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

The instructions of the generator 114 may instruct processor 110 to generate an identifier and to associate the identifier with the printing device. In one example, the identifier may be an e-mail address. In another example, a plurality of identifiers may be generated and associated with the same printing device such that each identifier has its own unique configuration. These identifiers may act as aliases for the printing device.

Settings module 116 may instruct processor 110 to further associate the identifier with a printing configuration that specifies how the printing device handles a print request. As noted above, multiple identifiers may be generated by generator 114 such that each identifier may be associated with its own configuration. A configuration may limit the number of pages being printed, the amount of ink to utilize per print request, or may specify a time window during which a print request may be received. Thus, the configuration may allow a user to control what, when, and how content is printed.

Job coordinator 118 may instruct processor 110 to determine whether a received print request originates from a trustworthy source; if it is determined that the source is not trustworthy, job coordinator 118 may instruct processor 110 to associate the received print request with the identifier. Job coordinator 118 may further instruct processor 110 to determine whether the received print request satisfies a condition indicated in the configuration and to print the content contained therein, if it is determined that the received print request satisfies the condition.

Figure 2:
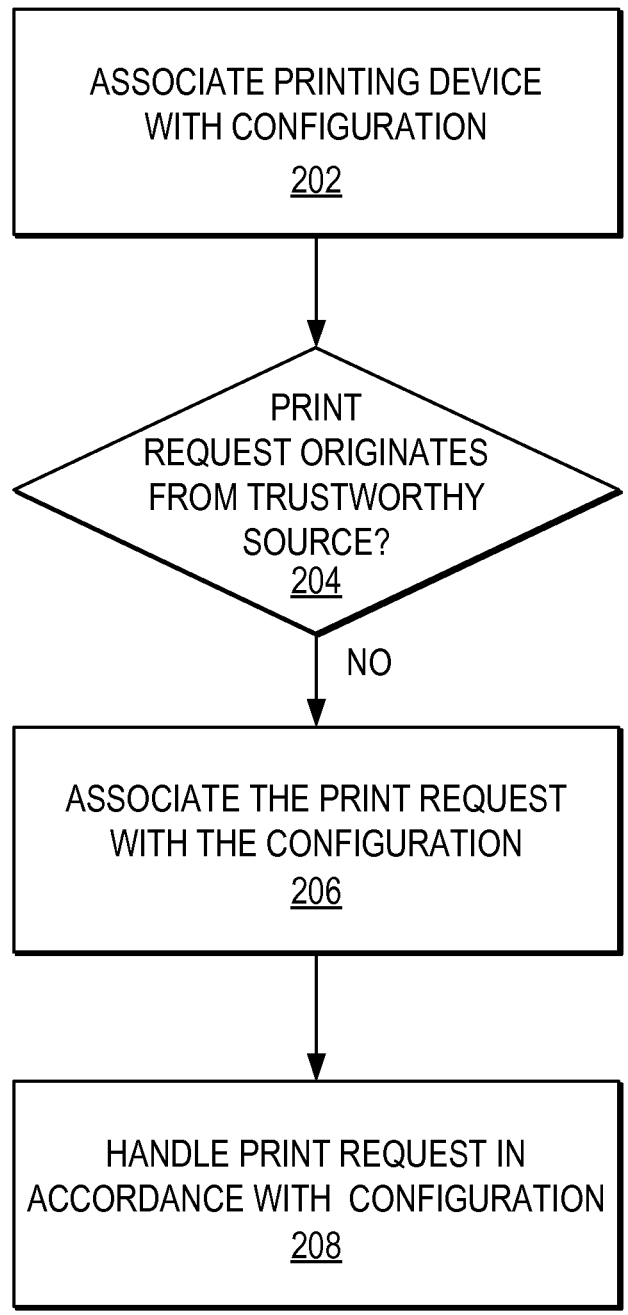
FIG. 2 is a flow diagram of an example method in accordance with aspects of the present disclosure.
Figure 4:
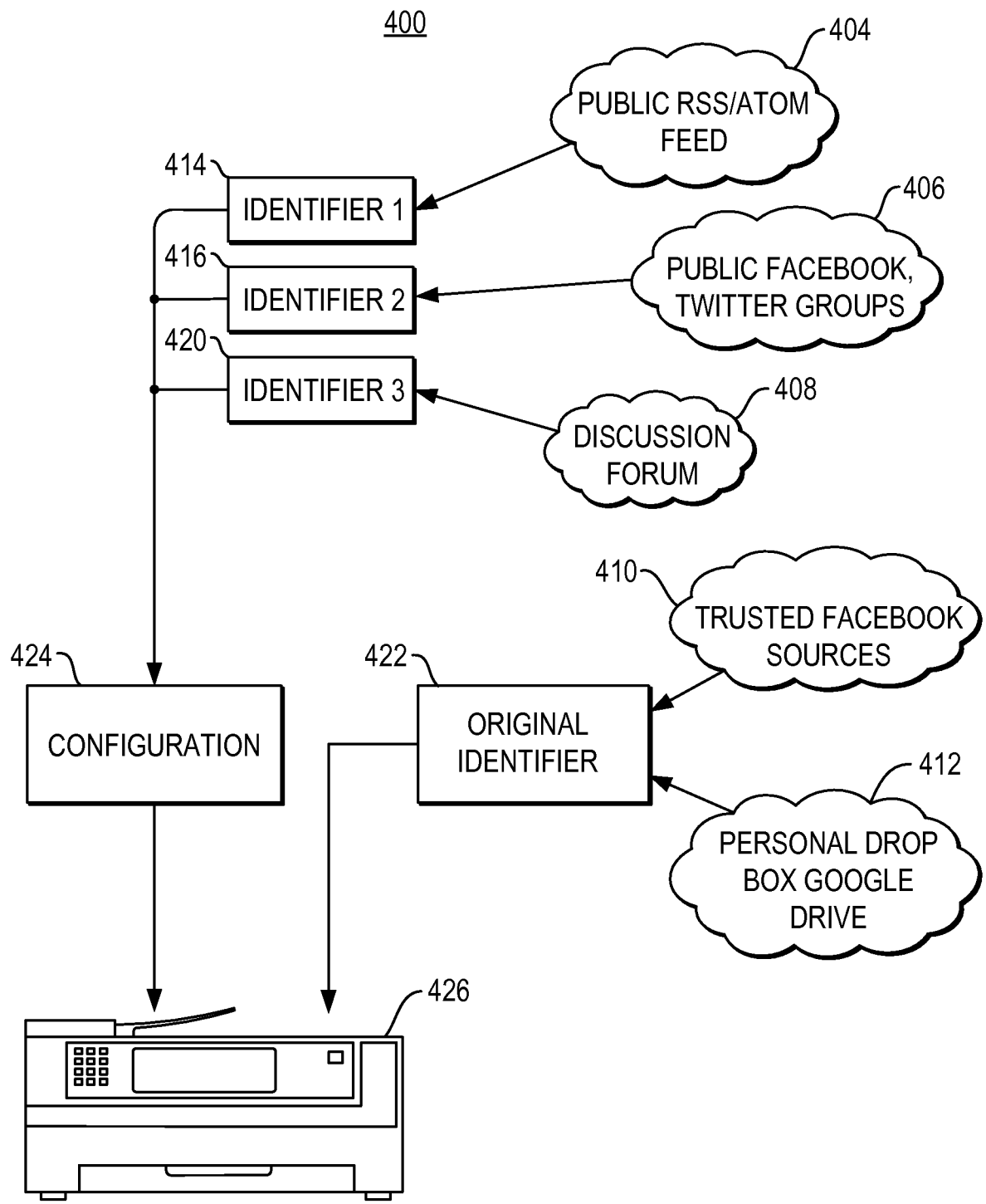
FIG. 4 is a working example in accordance with aspects of the present disclosure.

Working examples of the system, method, and non-transitory computer-readable medium are shown in FIGS. 2-4. In particular, FIG. 2 illustrates a flow diagram of an example method 200 for managing printing requests from untrustworthy sources. FIGS. 3-4 each show a working example in accordance with the techniques disclosed herein. The actions shown in FIGS. 3-4 will be discussed below with regard to the flow diagram of FIG. 2.

As shown in block 202 of FIG. 2, a printing device may be associated with a configuration. As noted above, each configuration may be further associated with an identifier, such as a unique email address. The e-mail address may be published on social networking sites, public discussion forums, or the like. In one example, the configuration may comprise items that specify a quality and quantity of content to print.

Referring now to FIG. 3, an example configuration screen 300 illustrates example limitations that may be imposed on the printing device and example conditions a print request may satisfy before printing the content therein. One of the example limitations is the number of pages that may be printed per request. In the example configuration screen 300, the number of pages per request is 2 pages. Another example limitation is the maximum number of pages that may be printed from a source associated with the configuration. Configuration screen 300 indicates that the maximum number of pages that may be printed by a source is 200 pages. In yet a further example, the type of data received may be specified. Configuration screen 300 indicates that only hyper text markup language ("html") files and comma delimited ("csv") files may be received from a source associated with the configuration. Moreover, a user may limit the total ink to use per request and the total ink to use overall for a given source. The illustrative screen shot of FIG. 3 shows the ink usage set at 2% per request and a total overall ink usage of 48%. In addition, configuration screen 300 illustrates keyword settings that may limit the content that is printed to content containing certain keywords. In the example of FIG. 3, the keywords "soccer" and "vegan recipes" are shown as example keywords. Accordingly, a user may print content containing topics of particular interest.

Referring back to FIG. 2, it may be determined whether the print request originates from a trustworthy source, as shown in block 204. Referring now to FIG. 4, RSS/ATOM feed 404, public facebook/twitter groups 406, and discussion forum 408 may be untrustworthy sources. Each of these sources may be associated with identifier 1-3 respectively. In the example of FIG. 4, each identifier is further associated with one configuration 424. However, it is understood that each identifier may be associated with its own unique configuration. The identifiers may be unique e-mail addresses or aliases that may be made public. Trusted facebook sources 410 and personal drop box 412 may be trusted sources. These trusted sources may be associated with an original identifier 422. This identifier may be kept private since it provides unlimited access to printer 426. Content generate by trusted facebook sources 410 and personal drop box 412 may print directly to printing device 426 without limitation.

Referring back to FIG. 2, if it is determined that the print request originates from an untrustworthy source, the print request may be associated with the configuration, as shown in block 206. In block 208, the print request may be handled in accordance with the configuration. Referring back to FIG. 4, printing device 426 may print content from RSS/ATOM feed 404, public facebook/twitter groups 406, and discussion forum 408 in accordance with configuration 424. Configuration 424 may contain the limitations illustrated in FIG. 3. However, it is understood that the configuration items illustrated in FIG. 3 are non-exhaustive and that other items may be included in the configuration file.

Advantageously, the foregoing system, method, and non-transitory computer readable medium provide users of network or web enabled printers to control what, when, and how content is printed. Furthermore, the techniques disclosed herein allow users to customize configurations for each source deemed untrustworthy. In this regard, rather than banning all content from certain sources, users may print content from sources they may find interesting while protecting the printer from misuse or exploitation.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein; rather, processes may be performed in a different order or concurrently and steps may be added or omitted.

What is claimed is:

1. A print system comprising:
    a processor; and
    a memory storing instructions that, when executed by the processor, cause the print system to:
        generate a plurality of unique email addresses for printing to a single printing device, each of the plurality of unique email addresses indicative of an untrustworthy print request source and associated with a unique printing configuration to handle print requests from the untrustworthy print request source;
        receive a print request, addressed to an email address, from a print request source;

if the email address is an original email address that provides unlimited printing access to the printing device, print the print request without reference to any of the unique printing configurations; and if the email address is one of the plurality of unique email addresses, determine whether the received print request satisfies at least one condition of the unique printing configuration associated with the respective unique identifier, and if the received print request satisfies the at least one condition, print the received print request in accordance with the unique printing configuration associated with the respective unique identifier.

2. The system of claim 1, wherein the at least one condition of the unique printing configuration associated with the respective unique email address specifies an ink limit for aggregate usage of ink by the print request source.

3. The system of claim 1, wherein the at least one condition of the unique printing configuration associated with the respective unique email address specifies a data type requirement for content of the received print request.

4. The system of claim 1, further comprising:
a display;
wherein the executed instructions further cause the system to:
provide a configuration screen on the display, the configuration screen enabling a user to configure the at least one condition for the unique printing configuration associated with the respective unique email address.

5. A non-transitory computer readable medium storing instructions that, when executed by a processor of a computing system, cause the computing system to:
generate a plurality of email addresses for printing to a single printing device, each of the plurality of email addresses being associated with a unique printing configuration to handle print requests;
receive a print request, from a print request source, addressed to a respective one of the plurality of email addresses, wherein the respective email address indicates that the print request source comprises an untrustworthy source from which printing the received print request is disallowed by default;
based on the print request source comprising an untrustworthy source, determine whether the received print request satisfies at least one print-allowing condition of the unique printing configuration associated with the respective email address, wherein the at least one print-allowing condition is not an email address; and
in response to determining that the received print request satisfies the at least one print-allowing condition, print the received print request in accordance with the unique printing configuration associated with the respective email address.

6. The non-transitory computer readable medium of claim 5, wherein the plurality of email addresses includes an original email address providing unlimited printing access to the printing device without assessing trustworthiness of the print request source and without reference to any of the unique printing configurations.

7. The non-transitory computer readable medium of claim 5, wherein the at least one condition of the unique printing configuration associated with the respective email address specifies an ink limit for usage of ink by the print request.

8. The non-transitory computer readable medium of claim 5, wherein the at least one condition of the unique printing configuration associated with the respective email address specifies a data type requirement for content of the received print request.

9. The non-transitory computer readable medium of claim 5, wherein the executed instructions further cause the computing system to:
provide a configuration screen on a display of the computing system, the configuration screen enabling a user to configure the at least one condition for the unique printing configuration associated with the respective email address.

10. A computer-implemented method of handling print requests, the method being performed by one or more processors of a computing system and comprising:
generating a plurality of email addresses for printing to a single printing device, each of the plurality of email addresses being associated with a unique printing configuration to handle print requests;
receiving a print request, from a print request source, addressed to a respective one of the plurality of email addresses, wherein the respective email address indicates that the print request source comprises an untrustworthy source; and
based on the print request source comprising an untrustworthy source, handling the received print request in accordance with the unique printing configuration associated with the respective email address, wherein the plurality of email addresses are different from an original email address which provides unlimited printing access to the printing device without reference to any of the unique printing configurations.

11. The method of claim 10, further comprising:
prior to handling the received print request, determining that the received print request satisfies at least one of the unique printing configuration associated with the respective email address;
wherein the one or more processors print the received print request in response to determining that the received print request satisfies the at least one condition of the unique printing configuration associated with the respective email address.

12. The method of claim 11, wherein the at least one condition of the unique printing configuration associated with the respective email address specifies a time window in which print requests may be received.

13. The method of claim 11, wherein the at least one condition of the unique printing configuration associated with the respective email address specifies a data type requirement for content of the received print request.

14. The method of claim 11, further comprising:
providing a configuration screen on a display of the computing system, the configuration screen enabling a user to configure the at least one condition for the unique printing configuration associated with the respective unique email address.

* * * * *